United States Patent [19]

Buss et al.

[11] Patent Number: 4,636,298
[45] Date of Patent: Jan. 13, 1987

[54] REFORMING PROCESS

[75] Inventors: Waldeen C. Buss, Kensington; Thomas R. Hughes, Orinda, both of Calif.

[73] Assignee: Chevron Research Company, San Francisco, Calif.

[21] Appl. No.: 679,161

[22] Filed: Dec. 7, 1984

Related U.S. Application Data

[63] Continuation of Ser. No. 519,157, Aug. 1, 1983, abandoned, which is a continuation-in-part of Ser. No. 420,540, Sep. 20, 1982, abandoned, which is a continuation-in-part of Ser. No. 344,570, Feb. 1, 1982, abandoned, and a continuation-in-part of Ser. No. 344,572, Feb. 1, 1982, Pat. No. 4,435,283.

[51] Int. Cl.[4] .............................................. C10G 35/06
[52] U.S. Cl. ........................................ 208/65; 208/64; 208/79; 208/80; 208/139
[58] Field of Search .................... 208/64, 65, 139, 79, 208/80

[56] References Cited

U.S. PATENT DOCUMENTS

| | | | |
|---|---|---|---|
| 3,397,137 | 8/1968 | Pickert et al. | 208/138 |
| 3,658,691 | 4/1972 | Keith et al. | 208/65 |
| 3,783,123 | 1/1974 | Young | 208/111 |
| 4,104,320 | 8/1978 | Bernard et al. | 208/141 |
| 4,401,557 | 8/1983 | Juquin et al. | 208/139 |

FOREIGN PATENT DOCUMENTS

| | | |
|---|---|---|
| 0981094 | 1/1965 | United Kingdom . |
| 1074129 | 6/1967 | United Kingdom . |
| 1161071 | 8/1969 | United Kingdom . |
| 1183000 | 3/1970 | United Kingdom . |
| 1497526 | 1/1978 | United Kingdom . |

*Primary Examiner*—Curtis R. Davis
*Attorney, Agent, or Firm*—S. R. La Paglia; E. A. Schaal; P. L. McGarrigle, Jr.

[57] ABSTRACT

A hydrocarbon conversion process is disclosed wherein the alkanes are contacted with a catalyst containing a metallic oxide support and a Group VIII metal, and with a catalyst containing a large-pore zeolite, a Group VIII metal, and an alkaline earth metal.

25 Claims, No Drawings

REFORMING PROCESS

CROSS REFERENCE TO RELATED CASES

This is a continuation of Ser. No. 519,157, filed Aug. 1, 1983, now abandoned, which is a continuation-in-part of Ser. No. 420,540, filed Sept. 20, 1982, now abandoned, which is a continuation-in-part of Ser. No. 344,570, filed Feb. 1, 1982, now abandoned, and Ser. No. 344,572, filed Feb. 1, 1982, now U.S. Pat. No. 4,435,283.

BACKGROUND OF THE INVENTION

The invention relates to a new hydrocarbon conversion process wherein hydrocarbons are contacted with two reforming catalysts, one of which has a superior selectivity for dehydrocyclization.

Catalytic reforming is well known in the petroleum industry and refers to the treatment of naphtha fractions to improve the octane rating and/or to produce aromatic hydrocarbons for use as chemical feedstock. The more important hydrocarbon reactions occurring during reforming operation include dehydrogenation of cyclohexanes and dehydroisomerization of alkylcyclopentanes to aromatics, dehydrocyclization of paraffins to aromatics, isomerization of normal paraffins to isoparaffins, dealkylation of alkylbenzenes, and hydrocracking. Hydrocracking reactions which produce light gaseous hydrocarbons, e.g., methane, ethane, propane and butane are to be minimized during reforming as this decreases the yield of gasoline boiling range products.

Catalysts comprising platinum, for example, platinum supported on alumina, are well known and widely used for reforming of naphthas and gasoline boiling range materials in order to produce high octane number gasolines.

A particularly advantageous method of reforming is in the presence of hydrogen with a catalyst composition of a porous solid catalyst support, such as alumina, and 0.1 to 3 percent platinum and 0.01 to 5 weight percent rhenium. Other bimetallic catalysts reported to be advantageous include platinum-tin, platinum-germanium, platinum-lead, and platinum-iridium.

The possibility of using carriers other than alumina has also been studied and it was proposed to use certain molecular sieves such as X and Y zeolites, because the pore sizes of the zeolites were large enough to pass the reactant and product molecules through the pores of the zeolite. However, catalysts based upon these molecular sieves have not been commercially successful.

In the conventional method of carrying out the aforementioned dehydrocyclization, hydrocarbons to be converted are passed over the catalyst, in the presence of hydrogen, at temperatures of 430° C. to 550° C. and pressures of 100 to 500 psig. Part of the hydrocarbons are converted into aromatic hydrocarbons, and the reaction is accompanied by isomerization and cracking reactions which also convert the paraffins into isoparaffins and lighter hydrocarbons.

The catalysts hitherto used have given moderately satisfactory results with heavy paraffins, but less satisfactory results with $C_6$–$C_8$ paraffins, particularly $C_6$ paraffins. Catalysts based on a type L zeolite are more selective with regard to the dehydrocyclization reaction; can be used to improve the rate of conversion to aromatic hydrocarbons without requiring higher temperatures and lower pressures, which usually have a considerable adverse effect on the stability of the catalyst; and produce excellent results with $C_6$–$C_8$ paraffins, but run length is a problem.

In one method of dehydrocyclizing aliphatic hydrocarbons, hydrocarbons are contacted in the presence of hydrogen at a temperature of 430° C. to 550° C. with a catalyst consisting essentially of a type L zeolite having exchangeable cations of which at least 90% are alkali metal ions selected from the group consisting of ions of sodium, lithium, potassium, rubidium and cesium and containing at least one metal selected from the group which consists of metals of Group VIII of the Periodic Table of Elements, tin and germanium, said metal or metals including at least one metal from Group VIII of said Periodic Table having a dehydrogenating effect, so as to convert at least part of the feedstock into aromatic hydrocarbons.

A particularly advantageous embodiment of this method is a platinum/alkali metal/type L zeolite catalyst because of its excellent activity and selectivity for converting hexanes and heptanes to aromatics, but run length remains a problem.

SUMMARY OF THE INVENTION

The present invention overcomes the deficiencies of the prior art by using a first reforming catalyst comprising a metallic oxide support and a Group VIII metal and by using a second catalyst comprising a large-pore zeolite, at least one Group VIII metal (preferably platinum or iridium, most preferably platinum); and an alkaline earth element selected from the group consisting of barium, strontium and calcium (preferably barium).

Preferably, the large-pore zeolite is a type L zeolite which contains from 0.1% to 5% by weight platinum and 0.1% to 35% by weight barium. The product from the first catalyst is contacted with the second catalyst at a temperature of from 400° C. to 600° C. (preferably 450° C. to 550° C.); an LHSV of from 0.3 to 5; a pressure of from 1 atmosphere to 500 psig (preferably 50 to 300 psig); and an $H_2/HC$ ratio of from 1:1 to 10:1 (preferably from 2:1 to 6:1).

DESCRIPTION OF THE PREFERRED EMBODIMENTS

In its broadest aspect, the present invention involves the use of a first catalyst which is a conventional reforming catalyst and a second catalyst which is a dehydrocyclization zeolitic catalyst comprising a large-pore zeolite, an alkaline earth element and a Group VIII metal in the reforming of hydrocarbons, The term "selectivity" as used in the present invention is defined as the percentage of moles of paraffin converted to aromatics relative to moles converted to aromatics and cracked products, $$\text{i.e., Selectivity} = \frac{100 \times \text{moles of paraffins converted to aromatics}}{\text{moles of paraffins converted to aromatics and cracked products}}$$

Isomerization reactions and formation of alkylcyclopentanes are not considered in determining selectivity.

The term "selectivity for n-hexane" as used in the present invention is defined as the percentage of moles of n-hexane converted to aromatics relative to moles converted to aromatics and cracked products.

The selectivity for converting paraffins to aromatics is a measure of the efficiency of the process in converting paraffins to the desired and valuable products: aromatics and hydrogen, as opposed to the less desirable products of hydrocracking.

Highly selective dehydrocyclization catalysts produce more hydrogen than less selective catalysts because hydrogen is produced when paraffins are converted to aromatics and hydrogen is consumed when paraffins are converted to cracked products. Increasing the selectivity of the process increases the amount of hydrogen produced (more aromatization) and decreases the amount of hydrogen consumed (less cracking).

Another advantage of using highly selective dehydrocyclization catalysts is that the hydrogen produced by highly selective catalysts is purer than that produced by less selective catalysts. This higher purity results because more hydrogen is produced, while less low boiling hydrocarbons (cracked products) are produced. The purity of hydrogen produced in reforming is critical if, as is usually the case in an integrated refinery, the hydrogen produced is utilized in processes such as hydrotreating and hydrocracking, which require at least certain minimum partial pressures of hydrogen. If the purity becomes too low, the hydrogen can no longer be used for this purpose and must be used in a less valuable way, for example as fuel gas.

In the method according to the invention, the feed hydrocarbons preferably comprise nonaromatic hydrocarbons containing at least 6 carbon atoms. Preferably, the feedstock is substantially free of sulfur, nitrogen, metals and other known poisons for reforming catalysts.

The first reforming catalyst comprises a metallic oxide support having disposed therein a Group VIII metal. Suitable metallic oxide supports include alumina and silica. Preferably, the first reforming catalyst comprises a metallic oxide support having disposed therein a Group VIII metal (preferably platinum) and a second Group VIII metal or promoter element, such as rhenium, tin, germanium, cobalt, nickel, iridium, rhodium, ruthenium and combinations thereof. More preferably, the first reforming catalyst comprises an alumina support, platinum, and tin or germanium. Preferably, the catalyst is not presulfided, since the second catalyst is extremely sensitive to sulfur poisoning. If the first catalyst requires presulfiding, then something should be done to prevent sulfur poisoning of the second catalyst. Possible options include: (1) using a sulfur sorber or getter between the first and second catalysts; (2) presulfiding the first catalyst externally, and stripping the removable sulfur with hydrogen; and (3) presulfiding the first catalyst with a minimum amount of sulfur which is retained by the first catalyst.

The hydrocarbon conversion process with both catalysts is carried out in the presence of hydrogen at a pressure adjusted so as to favor the dehydrocyclization reaction thermodynamically and to limit undesirable hydrocracking reactions. The pressures used preferably vary from 1 atmosphere to 500 psig, more preferably from 50 to 300 psig, the molar ratio of hydrogen to hydrocarbons preferably being from 1:1 to 10:1, more preferably from 2:1 to 6:1.

In the temperature range of from 400° C. to 600° C., the dehydrocyclization reaction occurs with acceptable speed and selectivity.

If the operating temperature of dehydrocyclization is below 400° C., the reaction speed is insufficient and consequently the yield is too low for industrial purposes. When the operating temperature of dehydrocyclization is above 600° C., interfering secondary reactions such as hydrocracking and coking occur, and substantially reduce the yield. It is not advisable, therefore, to exceed the temperature of 600° C.

The preferred temperature range (430° C. to 550° C.) of dehydrocyclization is that in which the process is optimum with regard to activity, selectivity and the stability of the catalyst.

The liquid hourly space velocity of the hydrocarbons in the dehydrocyclization reaction is preferably between 0.3 and 5.

The second catalyst according to the invention is a large-pore zeolite charged with one or more dehydrogenating constituents. The term "large-pore zeolite" is defined as a zeolite having an effective pore diameter of 6 to 15 Angstroms.

Among the large-pored crystalline zeolites which have been found to be useful in the practice of the present invention, type L zeolite, zeolite X, zeolite Y and faujasite are the most important and have apparent pore sizes on the order of 7 to 9 Angstroms.

A composition of type L zeolite, expressed in terms of mole ratios of oxides, may be represented as follows:

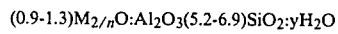

$(0.9\text{-}1.3)M_{2/n}O:Al_2O_3(5.2\text{-}6.9)SiO_2:yH_2O$ wherein M designates a cation, n represents the valence of M, and y may be any value from 0 to about 9. Zeolite L, its X-ray diffraction pattern, its properties, and method for its preparation are described in detail in U.S. Pat. No. 3,216,789. U.S. Pat. No. 3,216,789 is hereby incorporated by reference to show the preferred zeolite of the present invention. The real formula may vary without changing the crystalline structure; for example, the mole ratio of silicon to aluminum (Si/Al) may vary from 1.0 to 3.5.

The chemical formula for zeolite Y expressed in terms of mole ratios of oxides may be written as:

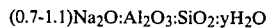

$(0.7\text{-}1.1)Na_2O:Al_2O_3:SiO_2:yH_2O$ wherein x is a value greater than 3 up to about 6 and y may be a value up to about 9. Zeolite Y has a characteristic X-ray powder diffraction pattern which may be employed with the above formula for identification. Zeolite Y is described in more detail in U.S. Pat. No. 3,130,007. U.S. Pat. No. 3,130,007 is hereby incorporated by reference to show a zeolite useful in the present invention.

Zeolite X is a synthetic crystalline zeolitic molecular sieve which may be represented by the formula:

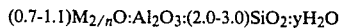

$(0.7\text{-}1.1)M_{2/n}O:Al_2O_3:(2.0\text{-}3.0)SiO_2:yH_2O$ wherein M represents a metal, particularly alkali and alkaline earth metals, n is the valence of M, and y may have any value up to about 8 depending on the identity of M and the degree of hydration of the crystalline zeolite. Zeolite X, its X-ray diffraction pattern, its properties, and method for its preparation are described in detail in U.S. Pat. No. 2,882,244. U.S. Pat. No. 2,882,244 is hereby incorporated by reference to show a zeolite useful in the present invention.

The preferred dehydrocyclization catalyst according to the invention is a type L zeolite charged with one or more dehydrogenating constituents.

An essential element of the present invention is the presence of an alkaline earth element in the large-pore zeolite. That alkaline earth element must be either barium, strontium or calcium, preferably barium. The alkaline earth metal can be incorporated into the zeolite by synthesis, impregnation or ion exchange. Barium is preferred to the other alkaline earths because it results in a somewhat less acidic catalyst. Strong acidity is undesirable in the catalyst because it promotes cracking, resulting in lower selectivity.

In one embodiment, at least part of the alkali metal ion is exchanged with barium, using techniques known for ion exchange of zeolites. This involves contacting the zeolite with a solution containing excess $Ba^{++}$ ions. The barium should constitute from 0.1% to 35% of the weight of the zeolite.

The large-pore zeolitic catalysts according to the invention are charged with one or more Group VIII metals, e.g., nickel, ruthenium, rhodium, palladium, iridium or platinum.

The preferred Group VIII metals are iridium and particularly platinum, which are more selective with regard to dehydrocyclization and are also more stable under the dehydrocyclization reaction conditions than other Group VIII metals.

The preferred percentage of platinum in the dehydrocyclization catalyst is between 0.1% and 5%, the lower limit corresponding to minimum catalyst activity and the upper limit to maximum activity. This allows for the high price of platinum, which does not justify using a higher quantity of the metal since the result is only a slight improvement in catalyst activity.

Group VIII metals are introduced into the large-pore zeolite by synthesis, impregnation or exchange in an aqueous solution of appropriate salt. When it is desired to introduce two Group VIII metals into the zeolite, the operation may be carried out simultaneously or sequentially.

By way of example, platinum can be introduced by impregnating the zeolite with an aqueous solution of tetrammineplatinum (II) nitrate, tetrammineplatinum (II) hydroxide, dinitrodiamino-platinum or tetrammineplatinum (II) chloride. In an ion exchange process, platinum can be introduced by using cationic platinum complexes such as tetrammineplatinum (II) nitrate.

An inorganic oxide may be used as a carrier to bind the large-pore zeolite containing the Group VIII metal and alkaline earth metal. The carrier can be a natural or a synthetically produced inorganic oxide or combination of inorganic oxides. Typical inorganic oxide supports which can be used include clays, alumina, and silica, in which acidic sites are preferably exchanged by cations which do not impart strong acidity (such as Na, K, Rb, Cs, Ca, Sr, or Ba).

The large-pore zeolitic dehydrocyclization catalyst can be employed in any of the conventional types of equipment known to the art. It may be employed in the form of pills, pellets, granules, broken fragments, or various special shapes, disposed as a fixed bed within a reaction zone, and the charging stock may be passed therethrough in the liquid, vapor, or mixed phase, and in either upward or downward flow. Alternatively, it may be prepared in a suitable form for use in moving beds, or in fluidized-solid processes, in which the charging stock is passed upward through a turbulent bed of finely divided catalyst.

After the desired metal or metals have been introduced, the dehydrocyclization catalyst is treated in air at from 250° to 350° C. and then reduced in hydrogen at temperatures of from 200° C. to 700° C., preferably 300° C. to 620° C.

At this stage it is ready for use in the dehydrocyclization process. In some cases however, for example when the metal or metals have been introduced by an ion exchange process, it is preferable to eliminate any residual acidity of the zeolite by treating the reduced catalyst with an aqueous solution of a salt or hydroxide of a suitable alkali or alkaline earth element in order to neutralize any hydrogen ions formed during the reduction of metal ions by hydrogen.

In order to obtan optimum selectivity, temperature should be adjusted so that dehydrocyclization reaction rate is appreciable, but conversion is less than 98%, as excessive temperature and degree of reaction can have an adverse effect on selectivity. Pressure should also be adjusted within a proper range. Too high a pressure will place a thermodynamic (equilibrium) limit on the desired reaction, especially for hexane aromatization, and too low a pressure may result in coking and deactivation.

The hydrocarbons can be contacted with the two catalysts in series, with the hydrocarbons first being contacted with the first (conventional) reforming catalyst, and then with the second (dehydrocyclization zeolitic) catalyst; or with the hydrocarbons first being contacted with the second catalyst, and then with the first catalyst. Also the hydrocarbons can be contacted in parallel with one fraction of the hydrocarbons being contacted with the first catalyst and another fraction of the hydrocarbons being contacted with the second catalyst. Also the hydrocarbons can be contacted with both catalysts simultaneously in the same reactor.

EXAMPLES

The invention will be further illustrated by the following example which set forth a particularly advantageous method and composition embodiments. While the examples are provided to illustrate the present invention, they are not intended to limit it.

An Arabian Naphtha which had been hydrofined to remove sulfur, oxygen and nitrogen was reformed at 100 psig, 3 LHSV, and $3H_2/HC$ to produce $C_5+$ product having an aromatics content of 82 wt.% by two different processes. The feed was a hydrofined Arabian Naphtha containing 67.9% paraffins, 23.7% naphthenes, and 8.4% aromatics. Distillation results by D86 method were: start-203° F., 5%-219, 10%-224, 30%-248, 50%-265, 70%-291, 90%-321, 95%-337, EP 370° F.

In the first process, the Arabian Naphtha was reformed at 516° C. in a reactor using a conventional reforming catalyst comprising 0.3 Pt, 0.6 Re, 1.0 Cl (wt %) on alumina. It was presulfided separately.

In the second process, the Arabian Naphtha was reformed at 493° C. in the same reactor wherein the top half of the reactor contained the same type of catalyst as that of the first process and the bottom half of the reactor contains a platinum-barium-type L zeolite catalyst formed by (1) ion exchanging a potassium-type L zeolite with a sufficient volume of 0.17 molar barium nitrate solution to contain an excess of barium compared to the ion exchange capacity of the zeolite; (2) drying the resulting barium-exchanged type L zeolite catalyst; (3) calcining the catalyst at 590° C.; (4) impregnating the catalyst with 0.8% platinum using tetrammineplatinum (II) nitrate; (5) drying the catalyst; (6) calcining the catalyst at 260° C.; and (7) reducing the catalyst in hydrogen at 480° C. to 500° C. for 1 hour.

The results of these two runs are shown in Table I.

TABLE I

| | Pt/Re/Alumina | ⅓ Pt/Re/Alumina ⅓ Pt/Ba/L |
|---|---|---|
| Deactivation Rate | 2.0 | 1.9 |
| C$_5$+ yield, LV % yield | 68.9 | 71.0 |
| Hydrogen, SCF/D | 950 | 1050 |

While the present invention has been described with reference to specific embodiments, this application is intended to cover those various changes and substitutions which may be made by those skilled in the art without departing from the spirit and scope of the appended claims.

What is claimed is:

1. A reforming process comprising:
   (a) contacting a hydrocarbon feed with a first reforming catalyst at conditions which favor reforming to form a product stream, wherein said first reforming catalyst is bifunctional and comprises a metallic oxide support which contains acidic sites having disposed therein a Group VIII metal; and
   (b) contacting said product stream with a second reforming catalyst at conditions which favor reforming, wherein said second reforming catalyst is a monofunctional, non-acidic catalyst comprising a large-pore zeolite containing at least one Group VIII metal, and an alkaline element selected from the group consisting of calcium, barium and strontium.

2. A reforming process according to claim 1 wherein said first reforming catalyst contains platinum and a second Group VIII metal or promoter selected from the group consisting of rhenium, tin, germanium, cobalt, nickel, iridium, rhodium, ruthenium and combinations thereof.

3. A reforming process according to claim 2 wherein said metallic oxide support is alumina.

4. A reforming process according to claim 3 wherein said promoter element is either tin or germanium.

5. A reforming process according to claim 1 wherein said large-pore zeolite is a type L zeolite.

6. A reforming process according to claim 5 wherein said Group VIII metal in said second reforming catalyst is platinum.

7. A reforming process comprising:
   (a) contacting a hydrocarbon feed with a first reforming catalyst at conditions which favor reforming to produce a product stream, wherein said first reforming catalyst is bifunctional and comprises a metallic oxide support which contains acidic sites having disposed therein platinum and a second Group VIII metal or promoter element, and wherein said second Group VIII metal or promoter element is selected from the group consisting of rhenium, tin, germanium, cobalt, nickel, iridium, rhodium, ruthenium and combinations thereof; and
   (b) contacting said product stream with a second reforming catalyst at conditions which favor reforming, wherein said second reforming catalyst is a monofunctional, non-acidic catalyst comprising a type L zeolite containing platinum, and an alkaline metal selected from the group consisting of calcium, barium and strontium.

8. A reforming process according to claim 7 wherein said alkaline earth element is barium.

9. A reforming process according to claim 8 wherein said second reforming catalyst has from 0.1% to 35% by weight barium and from 0.1% to 5% by weight platinum.

10. A reforming process according to claim 8 wherein at least 80% of the crystals of said type L zeolite are larger than 100 Angstroms.

11. A reforming process according to claim 7 wherein said second reforming catalyst is oxidized and subsequently reduced prior to use as a catalyst.

12. A reforming process according to claim 8 wherein said hydrocarbon feed comprises C$_6$+ naphthas.

13. A reforming process comprising:
   (a) contacting a hydrocarbon feed comprising C$_6$+ naphthas with a first reforming catalyst at conditions which favor reforming to form a product stream, wherein said first reforming catalyst is bifunctional and comprises alumina which contains acidic sites having disposed therein in intimate admixture platinum and rhenium; and
   (b) contacting said product stream with a second reforming catalyst at conditions which favor reforming, wherein said second reforming catalyst is a monofunctional, non-acidic catalyst comprising a type L zeolite containing from 8% to 10% by weight barium and from 0.6% to 1.0% by weight platinum, wherein at least 80% of the crystals of said type L zeolite are larger than 1000 Angstroms, and wherein said second reforming catalyst is oxidized and subsequently reduced prior to use as a catalyst.

14. A reforming process comprising:
   (a) contacting a hydrocarbon feed with a first reforming catalyst at conditions which favor reforming to form a product stream, wherein said first reforming catalyst is bifunctional and comprises a metallic oxide support which contains acidic sites having disposed therein a Group VIII metal; and
   (b) contacting in a parallel step said hydrocarbon feed with a second reforming catalyst at conditions which favor reforming, wherein said second reforming catalyst is a monofunctional, non-acidic catalyst comprising a large-pore zeolite containing at least one Group VIII metal, and an alkaline earth metal selected from the group consisting of barium, strontium and calcium.

15. A reforming process according to claim 14 wherein said first reforming catalyst contains platinum and a second Group VIII metal or promoter selected from the group consisting of rhenium, tin, germanium, cobalt, nickel, iridium, rhodium, ruthenium and combinations thereof.

16. A reforming process according to claim 15 wherein said metallic oxide support is alumina.

17. A reforming process according to claim 16 wherein said promoter element is either tin or germanium.

18. A reforming process according to claim 14 wherein said large-pore zeolite is a type L zeolite.

19. A reforming process according to claim 18 wherein said Group VIII metal in said second reforming catalyst is platinum.

20. A reforming process comprising:
   (a) contacting a hydrocarbon feed with a first reforming catalyst at conditions which favor reforming to produce a product stream, wherein said first reforming catalyst is bifunctional and comprises a metallic oxide support which contains acidic sites having disposed therein platinum and a second Group VIII metal or promoter element, and wherein said second Group VIII metal or promoter element is selected from the group consisting of rhenium, tin, germanium, cobalt, nickel, iridium, rhodium, ruthenium and combinations thereof; and (b) contacting in a parallel step said hydrocarbon feed with a second reforming catalyst at conditions which favor reforming, wherein said second reforming catalyst is a monofunctional, non-acidic catalyst comprising a type L zeolite containing platinum, and an alkaline earth metal selected from the group consisting of barium, strontium and calcium.

21. A reforming process according to claim 20 wherein said alkaline earth element is barium.

22. A reforming process according to claim 21 wherein said second reforming catalyst has from 0.1% to 35% by weight barium and from 0.1% to 5% by weight platinum.

23. A reforming process according to claim 21 wherein at least 80% of the crystals of said type L zeolite are larger than 100 Angstroms.

24. A reforming process according to claim 20 wherein said second reforming catalyst is oxidized and subsequently reduced prior to use as a catalyst.

25. A reforming process according to claim 21 wherein said hydrocarbon feed comprises $C_6+$ naphthas.

* * * * *